United States Patent
Lindner et al.

(10) Patent No.: US 7,070,749 B2
(45) Date of Patent: Jul. 4, 2006

(54) DOPED PRECIPITATED SILICA

(75) Inventors: Gottlieb-Georg Lindner, Wesseling (DE); Astrid Mueller, Moembris (DE)

(73) Assignee: Degussa AG, Duesseldorf (DE)

( * ) Notice: Subject to any disclaimer, the term of this patent is extended or adjusted under 35 U.S.C. 154(b) by 242 days.

(21) Appl. No.: 10/014,712

(22) Filed: Dec. 14, 2001

(65) Prior Publication Data

US 2002/0112647 A1 Aug. 22, 2002

(30) Foreign Application Priority Data

Dec. 14, 2000 (DE) .......................... 100 62 449

(51) Int. Cl.
*C01B 33/193* (2006.01)
*D21H 19/40* (2006.01)
*B41M 5/00* (2006.01)
*D06P 1/673* (2006.01)
*D06M 11/79* (2006.01)

(52) U.S. Cl. .................. 423/339; 423/335; 162/181.6

(58) Field of Classification Search ............... 423/335, 423/339, 265; 162/181.4, 181.6
See application file for complete search history.

(56) References Cited

U.S. PATENT DOCUMENTS

| 3,424,602 | A |   | 1/1969 | Nauroth |         |
|-----------|---|---|--------|---------|---------|
| 4,426,216 | A | * | 1/1984 | Satoh et al. | 65/395 |
| 5,231,066 | A | * | 7/1993 | Rekers et al. | 502/239 |
| 5,484,581 | A | * | 1/1996 | Esch et al. | 423/335 |
| 5,591,797 | A | * | 1/1997 | Barthel et al. | 524/493 |
| 5,720,806 | A | * | 2/1998 | Fujii et al. | 106/483 |
| 5,852,099 | A | * | 12/1998 | Vanel | 524/494 |
| 5,989,510 | A | * | 11/1999 | Abe et al. | 423/339 |
| 6,214,383 | B1 | * | 4/2001 | Esch et al. | 424/489 |
| 6,279,633 | B1 | * | 8/2001 | Corvasce | 152/525 |
| 2003/0185739 | A1 | * | 10/2003 | Mangold et al. | 423/335 |

FOREIGN PATENT DOCUMENTS

| DE | 1 074 559 | 2/1960 |
| DE | 1 172 245 | 6/1964 |
| DE | 1 245 006 | 7/1967 |
| EP | 0 236 070 | 9/1987 |
| EP | 0 493 203 A1 | 7/1992 |
| EP | 0 493 263 | 7/1992 |
| EP | 0 643 015 A1 | 3/1995 |
| EP | 0 798 348 A1 | 10/1997 |
| EP | 0 983 966 | 3/2000 |
| EP | 1 193 220 | 4/2002 |
| WO | WO 96/30302 | 10/1996 |
| WO | WO 96/30304 | 10/1996 |
| WO | WO 99/36360 | 7/1999 |
| WO | WO 01/64580 | 9/2001 |

* cited by examiner

*Primary Examiner*—Ngoc-Yen Nguyen
(74) *Attorney, Agent, or Firm*—Oblon, Spivak, McClelland, Maier & Neustadt, P.C.

(57) ABSTRACT

Foreign-atom-doped precipitated silicas having a BET surface area of more than 300 $m^2/g$ and a maximum surface concentration of the foreign atoms of 0.05 $mmol/m^2$, to a process for preparing them and to the use of the resulting precipitated silicas in papermaking.

19 Claims, No Drawings

DOPED PRECIPITATED SILICA

BACKGROUND OF THE INVENTION

1. Field of the Invention

The invention relates to precipitated silicas doped with two, three or four-valent metals, to a process for preparing them, and to the use of these doped precipitated silicas.

2. Description of the Background

Silicas and aluminum silicates prepared by precipitation using sodium silicate solution and sulfuric acid, sodium silicate solution and subsequent addition of a soluble metal salt are known. In these preparation processes, metal ions in the form of their salts or solutions thereof—for example, Zr, Ti, Zn ions—are added in a variety of ways. These ions may also enter into chemical bonds with constituents of the silica/silicate surface and may not be removed by simple washing. These ions generate cationic charges on the surface of the silicas/silicates and as a result, when used in the coating of inkjet papers, for example, ensure fixing of the usually anionic dyes and ensure bright colors in the paper coating.

For use in the paper industry there is a need for fillers which in inkjet media, for example, absorb the ink effectively and maintain the brightness of the colors. In order to be able to raise the printing speed and to reduce the size of the printed dot in inkjet printing, rapid drying is vital. One way of meeting these requirements is to apply coatings containing silica to the media. These coatings permit rapid ink absorption, enhance the dot definition, and promote the defined circular propagation of the ink droplet. Furthermore, they prevent showthrough or strikethrough of the ink and produce high color densities.

For use in the paper industry, therefore, there is a need for fillers which are extremely easy to disperse, which absorb the ink well in inkjet paper or inkjet film, for example, and which maintain the brightness of the colors.

The preparation of doped and undoped silicas and silicates has already been extensively described—for example, in EP 0 643 0 15, DE 117 2245 or DE 124 5006.

All of the precipitations described therein for preparing silica comprise three process steps: 1.) introduction of water and, optionally, sodium silicate solution, optionally adjustment of pH, conductivity by adding salts or solutions thereof (e.g., sodium sulfate); 2.) precipitation phase: here, usually by adding a mineral acid such as sulfuric acid, the precipitation of the silica or silicate is brought about; 3.) acidification of the silica/silicate suspension prior to further workup. All three phases are characterized by a specific temperature, metering and pH regime, possible interruption stages and/or intermediate stages, or the addition of different salts or solutions thereof.

In order to produce cationic sites on the surface of the silicas/silicates, metal ions that are at least divalent are added to the precipitated silica (EP 0 493 203). The metals in question may comprise alkaline earth metals, rare earth metals, transition metals (e.g., Ti, Zr, Fe, Ni, Zn), or aluminum. These metals may be added as ions in the form of their salts or solutions thereof. The salts may comprise organic salts or complexes, examples being carbonates, polycarbonates, or else inorganic salts such as halides, oxyhalides, nitrates, phosphates, sulfates, oxide sulfates, hydroxides, oxide hydroxides.

The ions mentioned manifest their activity especially if they are integrated (chemically bonded and/or physically fixed) into the surface of the silicas or silicates. For this to be so, however, the treatment of an already precipitated silica or silicate (suspensions thereof) with salts or solutions of said ions is not sufficient.

EP 0 492 263 discloses such processes. Here, metal salts for doping are applied either to pre-prepared and resuspended silica or to silica suspensions which have already been subjected to precipitation but not yet filtered. In both cases, although the metal ions are deposited on the surface of the particles, there is no chemical incorporation of the metals into the silicate structure. Doped silicas prepared in this way bleed easily, and the metal ions may be released.

It is an object of the present invention, therefore, to provide metal-ion-doped silicas in which the metal ions are to be substantially embedded into the silicate structure.

SUMMARY OF THE INVENTION

The present invention accordingly provides foreign-atom-doped precipitated silicas having a BET surface area of more than 300 $m^2/g$ and a maximum surface concentration of the foreign atoms on these precipitated silicas of 0.05 $mmol/m^2$.

DETAILED DESCRIPTION OF THE INVENTION

The foreign atoms used for doping may be Al, Zr, Zn, Ti, P, Cr, V, Sc, Ga, In, Fe, Ag, Sc, Mn, Co, Ni, Cu.

The surface concentration of these foreign atoms may lie between 0.05 $mmol/m^2$ and $1 \cdot 10^{-5}$ $mmol/m^2$ (0.01 $\mu mol/m^2$), preferably between $1 \cdot 10^{-3}$ and $1 \cdot 10^{-5}$ $mmol/m^2$ (from 1 to 0.01 $\mu mol/m^2$), with particular preference between $1 \cdot 10^{-3}$ and $1 \cdot 10^{-4}$ $mmol/m^2$ (from 1 to 0.1 $\mu mol/m^2$).

The BET surface area of the precipitated silica of the invention is more than 300 $m^2/g$, preferably between 350 to 800 $m^2/g$, with particular preference between 350 to 600 $m^2/g$.

The data on the surface concentration of the foreign atoms were determined for the sake of simplicity from the quotient of the molar fraction of the foreign atoms and of the BET surface area. These data represent a maximum value of the surface concentration on the assumption that the foreign atoms are concentrated entirely on the surface and not in the interior of the particles. This assumption, although met only in extreme cases, does, on the other hand, ensure that this value does not have to be redetermined when the product has been severely ground. Under severe grinding, there is an increase in the surface area of the particles; if the foreign atoms were actually concentrated only on the surface of the primary particle, then the surface concentration would fall correspondingly and would depend ultimately on the particle size.

The invention additionally provides a process for preparing the foreign-atom-doped precipitated silicas by adding sulfuric acid to an aqueous sodium silicate solution, which involves adding a solution of the foreign atoms in the form of organic or inorganic salts during the addition of the sulfuric acid.

At the same time as the sulfuric acid and the foreign atom solution, further sodium silicate solution may be added.

Following their preparation, the precipitated silicas obtained in this way may be filtered off and used further in the form of the filtercake redispersed in water or after drying of the filtercake (e.g., in spray dryers, nozzle tower dryers, spin flash dryers, Büttner dryers or rotary tube furnaces) and grinding (dry or wet, e.g., in a wet-jet mill).

The abovementioned foreign atoms may be added in the form of their organic or inorganic salts at different points in time and at different stages of the process of the invention, i.e., the precipitation. Addition of the foreign atoms and/or their solutions in the second half of the period of the addition of sulfuric acid or toward the end (15 to 5 minutes) of the joint addition of sodium silicate solution and sulfuric acid is preferred. With particular preference, the foreign atoms and/or the corresponding solution are/is added in the last third, with very particular preference in the last quarter, of the addition of the sulfuric acid. In this case, optimum incorporation, or good physicochemical bonding of the ions to the still-growing silica/silicate surface, is ensured and a high effective concentration on the surface of the silica particles is ensured even by small amounts of the specified ions.

A point to be emphasized with this way of generating the cationic sites is that these ions can only be removed by destroying the silica/silicate structure.

Where the foreign atoms are added throughout the precipitation period, they are also incorporated into the internal structures of the silica/silicate. By this means, with optional subsequent grinding (dry or wet grinding) of the silicas of the invention, particles are again obtained which have cationic sites on their entire surface.

The percentage fraction of the specified metal ions in the surface regions of the particles may, however, be a multiple of the weight percentages averaged over the particle mass, especially when the addition is made at the end of the addition of the sulfuric acid.

Where salts or solutions of the abovementioned ions are added in the course of wet grinding, there comes about an intimate connection between these ions and the newly forming particles, especially if submicron particles are being formed. This may be attributed to the destruction of the silica/silicate structure (agglomerates, aggregates), leading to the formation of an extremely active and reactive surface. In this case, as well as purely physical bonds of the ions to the silica/silicate, a chemical attachment is also possible. Wet grinding results in excellent dispersion and likewise permits a high solids fraction in the formulations. The addition of ions, i.e., salts, during dry grinding is likewise possible but leads only to a physical mixture.

The process of the invention may be practiced by using the foreign atoms such as, for example, Al, Zr, Zn, Ti, P, Cr, V, Sc, Ga, In, Fe, Ag, Sc, Mn, Co, Ni, and Cu in the form of chlorides, nitrates, carbonates, oxides, hydroxides, oxychlorides, phosphates, oxyhydroxides, oxide sulfates, polycarbonates and/or sulfates.

The addition of the foreign atoms to the precipitation reaction of the foreign-atom-doped precipitated silicas may be effected by adding an aqueous solution of these salts, either over the same period, the last half, the last third, the last quarter or the last eighth of the addition of the sulfuric acid.

The time of the addition of the salts need not necessarily be coupled to the period of the addition of the sulfuric acid alone. It is also possible, in the case of simultaneous addition of silicate and acid, to tie the addition of salt to the abovementioned addition times relating to the addition of silicate. Where the addition of silicate is carried out longer than the addition of acid, the time of the addition of salt may also be coupled exclusively to the addition of silicate.

It is also possible to add the foreign ions in a sulfuric acid solution. The foreign ions in the form of their salts are appropriately dissolved in the sulfuric acid which is also used to precipitate the silica.

The general parameters of the precipitation reaction such as temperature, stirring speed, concentration of the sodium silicate solution or sulfuric acid introduced, precipitation period, any interruption, dilution, etc. correspond to those for the preparation of undoped precipitated silicas. See, for example, DE 117 22 45, DE 124 50 06 or EP 97 10 4825.1.

Modern inks used in particular with all varieties of what is known as inkjet printing and its related processes are usually anionic in nature. It is therefore very important with regard to the fixing of the colorants (dyes and pigments), the brightness of the color, and the depth and definition of printing that the media to be printed have on their surface, or in their surface regions, particles having an at least partly cationic surface.

Silicas and silicates are already widely used today for abovementioned formulations of a coating (e.g., paper coating, film coating). Modification of these silicas and silicates so as to generate active, i.e., available, cationic sites on their surface meets the present-day requirements owing to the anionic colorants that are frequently used.

Because of the influence of the incorporated metal ions on the refractive index, further advantages may result with regard to use in transparent media, such as in connection with the use of silicas/silicates in coatings for films, for example.

Accordingly, the invention further provides for the use of the foreign-atom-doped silicas of the invention, and, respectively, the silicas prepared by the process of the invention, as an additive in papermaking.

In particular, silicas of the invention may be used in coatings for, for example, inkjet papers and in coatings for other printable media, such as overhead films or printable textiles. The silicas and silicates of the invention not only constitute fillers in the conventional sense but instead, owing to their unique properties, especially on their surface and upper layers, constitute active substances for specialty application, e.g., Fe-doped catalysts.

The silicas of the invention may be used not only in the form of dried and optionally ground products but also as dispersions. Advantages in further processing, and cost advantages, lie above all in the use of dispersed filtercakes of the precipitated silicas and/or silicates of the invention.

The precipitated silicas of the invention may further be hydrophobicized in whole or in part by treatment with silanes as described, for example, in DE 117 22 45 or DE 107 45 59.

For use in papermaking it is possible to admix the dispersions of the silicas of the invention with auxiliaries customary in the paper industry, such as polyalcohols, polyvinyl alcohol, synthetic or natural polymers, pigments ($TiO_2$, Fe oxides, Al metal filters), but also undoped silicas (precipitated silicas or Aerosils).

Having generally described this invention, a further understanding can be obtained by reference to certain specific examples which are provided herein for purposes of illustration only and are not intended to be limiting unless otherwise specified.

EXAMPLES

In Example 1, the metal salt concentration in the mother liquor was determined as being 56 μg/g of concentrated filtrate. The metal content of the silica therefore corresponds almost to the arithmetic figure, so that for Examples 2 to 4 only the arithmetic figure, corrected by the percentage loss in the waste water in accordance with Example 1, has been stated.

Example 1

A 40 l reactor which may be heated with steam is charged with 25.353 l of water. Dilute sulfuric acid containing zirconium is prepared by dissolving basic zirconium carbonate in 50% by weight sulfuric acid such that there are 59.9 g of basic zirconium carbonate per l of solution. At a temperature of 37° C., 3.75 l of sodium silicate solution (modulus 3.5) are metered in over 56 minutes, the pH of this suspension being held at 5.8 throughout the precipitation time by means of pH-controlled addition of the zirconium-containing sulfuric acid. Thereafter, the pH of the suspension is lowered to 3, the suspension is filtered, and the solid product is washed and spray-dried. The dried material is then ground on a ZPS mill to a d50 of 8.12 μm and is performance-tested in colored coating slips for inkjet paper coatings.

Analysis: BET = 519 m$^2$/g; loss on drying 7.4 g; found: 1.49% by weight ZrO$_2$ (M =123.2 g/mol), 1 g of product therefore corresponds to about 0.926 g of dried silica, with 1.49% meaning 0.0138 g = 0.112 μmol,
The surface concentration of the Zr is therefore 2.33.10$^{-3}$ mmol/m$^2$ Example 2

A 40 l reactor which may be heated with steam is charged with 25.353 l of water. Dilute sulfuric acid containing zirconium is prepared by dissolving basic zirconium carbonate in 50% by weight sulfuric acid such that there are 20.3 g of basic zirconium carbonate per l of solution. At a temperature of 37° C., 3.75 l of sodium silicate solution (modulus 3.5) are metered in over 56 minutes, the pH of this suspension being held at 5.8 throughout the precipitation time by means of pH-controlled addition of the zirconium-containing sulfuric acid. Thereafter, the pH of the suspension is lowered to 3, the suspension is filtered, and the solid product is washed and spray-dried. The dried material is then ground on a ZPS mill to a d50 of 6.86 μm and is performance-tested in colored coating slips for inkjet paper coatings.

Analysis: Arithmetic ZrO$_2$ content: 0.55% by weight
BET 505 m$^2$/g, surface concentration of Zr = 8.89.10$^{-4}$ mmol/m$^2$ Example 3

40 l reactor which may be heated with steam is charged with 25.353 l of water. Dilute sulfuric acid containing zirconium is prepared by dissolving basic zirconium carbonate in 50% by weight sulfuric acid such that there are 98.3 g of basic zirconium carbonate per l of solution. At a temperature of 37° C., 3.75 l of sodium silicate solution (modulus 3.5) are metered in over 56 minutes, the pH of this suspension being held at 5.8 throughout the precipitation time by means of pH-controlled addition of the zirconium-containing sulfuric acid. Thereafter, the pH of the suspension is lowered to 3, the suspension is filtered, and the solid product is washed and spray-dried. The dried material is then ground on a ZpS mill to a d50 value of 7.77 μm and tested in a paper coating slip and in a film coating slip.

Analysis: Arithmetic ZrO$_2$ content: 2.7% by weight
BET 546 m$^2$/g, surface concentration of Zr = 0.44.10$^4$ mmol/m$^2$.

Example 4

A 40 l reactor which may be heated with steam is charged with 25.353 l of water. Dilute sulfuric acid containing zirconium is prepared by dissolving basic zirconium carbonate in 50% by weight sulfuric acid such that there are 162.9 g of basic zirconium carbonate per 1l of solution. At a temperature of 37° C., 3.75 l of sodium silicate solution (modulus 3.5) are metered in over 56 minutes, the pH of this suspension being held at 5.8 throughout the precipitation time by means of pH-controlled addition of the zirconium-containing sulfuric acid. Thereafter, the pH of the suspension is lowered to 3, the suspension is filtered, and the solid product is washed and spray-dried. The dried material is then ground on a ZPS mill to a d50 value of 6.14 μm and tested in a paper coating slip and in a film coating slip.

Analysis: BET = 502 m$^2$/g; loss on drying 9.6 g; arithmetic ZrO$_2$, content 4.16% by weight, 1 g of product therefore corresponds to about 0.904 g of dried silica, with 4.16% meaning 0.0376 g = 0.305 μmol, The surface concentration of the Zr is therefore 6.7 ·10$^{-4}$ mmol/m$^2$ The zirconium fraction recovered by complete concentration of the filtrate is 56 ppm of ZrO$_2$; in other words, the zirconium salt employed is fully intercalated into the precipitated silica.

To prepare the colored coating slips, polyvinyl alcohol (PVA) was dissolved in the total amount of water at about 95° C., then the pigment was incorporated at from 500 to 1000 rpm and the formulation was dispersed at 3000 rpm for half an hour.

The colored coating slips containing the ZrO$_2$-doped precipitated silica were all adjusted to a solids content of 18%. Besides precipitated silica, the formulation also comprises pyrogenic silica, which contributes additionally to increasing the color brightness.

Formulation (paper)

Pigment 100 parts
Mowiol 28-99 (PVA) 35 arts (30 p)
Solids content at 18% (16%) (20%)
Application weight (target) about 10 g/m$^2$ The Brookfield viscosity was measured following agitation, and then 5 sheets were knife coated by hand with each of the samples. The samples were calendered and weighed before being subjected to the individual tests.

The overall evaluation is made, on the other hand, by graphic representation as well, by summing all of the printing results and the results of the absorbency tests:
- average scores from individual printing tests are entered directly as values
- the values of the absorbency times of black, cyano, magenta and yellow in seconds are added up, divided by 300, and then entered
- the values of the lengths of the drops of black, magenta and yellow taken off, in millimeters, are added together and then divided by 60 and entered This gives an approximately equal weighting of the individual tests in the case of "worst and best possible" test results of the respective methods. Since no HP 550C evaluation after the new printing test is possible for the stated standard formulation, this is not taken into account below.

| | | Example 1 Physico- | Example 2 Chemical | Standard formulation 8O p Sipemat 310/20 p MOX 170 Data |
|---|---|---|---|---|
| Loss on drying | % | 6.3 | 7.4 | 2.31/<1.5 |
| BET surface area | m$^2$/g | 505 | 519 | 787/170 |
| DBP absorption (anhydrous) | g/100 g | 164 | 167 | 254 |
| SR, sprinkler >45 μm | % | <0.1 | 0.02 | — |
| Particle size | | | | |
| Cilas d50 | μm | 6.86 | 8.12 | 5.2 |
| Cilas d5 | μm | 12.9 | 15.4 | 10 |
| Cilas d95 | μm | 2.15 | 2.48 | 2.8 |
| ZrO$_2$ content | % by wt. | 0.55 | 1.57 | — |

| Performance characteristics | | | | |
|---|---|---|---|---|
| Specimen designation | | Example 1 | Example 2 | Standard formulation |
| Viscosity, Br.f. | 5 rpm | 480 | 440 | 10240 |
| (after 1–2 days) | 10 rpm | 470 | 430 | 7040 |
| | 20 rpm | 460 | 435 | 4700 |
| | 50 rpm | 462 | 442 | 2975 |
| | 100 rpm | 462 | 441 | 2190 |
| Slip adhesion | | very good adhesion | very good adhesion | good-very good adhesion |
| Smoothness | | very smooth | very smooth | smooth-moderate |

| Performance investigation in inkjet paper | | | Example 1 | Example 2 | Standard formulation 80p Sipernat 310/20p MOX 170 |
|---|---|---|---|---|---|
| Test A | C | mm | 8 | 8 | 10 |
| Droplet size/diameter | M | mm | 8 | 8 | 13 |
| (7.5 µl) | Y | mm | 8 | 8 | 10 |
| | K | mm | 12** | 13** | 11 |
| Test B | C | sec | 320 | 340 | 520 |
| Drying time | M | sec | 545 | 560 | 340 |
| (1.0 µl) | Y | sec | 380 | 360 | 420 |
| | K | sec | 20 | 17 | 56 |
| Test C | C | mm | 19 | 17 | 14 |
| Length of drawn-out | M | mm | 19 | 20 | 15 |
| droplet (1.0 µl) | Y | mm | 19 | 16 | 23 |
| | K | mm | 6* | 7* | 7 |
| Appearance | CMY | | 4+ | 4+ | 3 |
| | K | | 5 | 5 | 5 |
| Color intensity | CMY | | I | I | II |
| | K | | III | III | II |
| Strikethrough | CMY | | — | — | — |
| | K | | 0 | 0 | — |

| Performance investigation in inkjet paper | | LV 6990 0.55% ZrO$_2$ | LV 6993 1.57% ZrO$_2$ | Standard formulation 80 p Sipernat 310/20 p MOX 170 |
|---|---|---|---|---|
| Evaluation of printing test by means of HP 550C (four-color printing)-300 dpi | | | | |
| Color | CMY | 2 | 2 | 1 |
| intensity | K | 3 | 3− | 2 |
| Dot definition | K in CMY | 2 | 2 | 2, |
| Transitions | CMY/CMY | 1− | 1− | 2 |
| | K/CMY | 2 | 2 | n.b. |
| Contours | | 1 | 1 | n.b. |
| Text | | 1 | 1 | 1 |
| Halftone | | 1− | 1− | 1 |
| Vis.image quality | | 2+ | 2− | n.b. |
| Overall total | | 15.75 | 17.00 | n.b. |
| Average | | 1.75 | 1.89 | n.b. |
| Evaluation of printing test by means of Epson Stylus Color 800 (four-color printing)-720 dpi | | | | |
| Color | CMY | 1 | 1 | 1+ |
| Intensity | K | 1 | 1 | 3+ |

-continued

| Performance investigation in inkjet paper | | LV 6990 0.55% $ZrO_2$ | LV 6993 1.57% $ZrO_2$ | Standard formulation 80 p Sipernat 310/20 p MOX 170 |
|---|---|---|---|---|
| Dot definition | K in CMY | 3 | 2 | 1 |
| Transitions | CMY/CMY | 3– | 2– | 1 |
| | K/CMY | 3– | 2 | 1 |
| Contours | | 4 | 2 | 1 |
| Text | | 1– | 1 | 1 |
| Halftone | | 2 | 2 | 1 |
| Vis.image quality | | 2– | 2– | 1– |
| Overall total | | 22.00 | 16.00 | 11.00 |
| Average | | 2.44 | 1.78 | 1.22 | n.b. = not determined
K) Black C) Cyan M) Magenta Y) Yellow

Assessment table and evaluation scheme for tests A, B, and C:

| | Droplet appearance and drying behavior | | Color intensity | | | Strikethrough behavior |
|---|---|---|---|---|---|---|
| 1 | Droplet is absorbed immediately and uniformly, linear margins | I | strong, brilliantly clear shades | ++ | no strikethrough on the reverse of the paper | |
| 2 | Droplet is absorbed immediately and uniformly, beveled margins, slight blotting paper effect | II | strong, clear shades | + | very slight strikethrough on the reverse of the paper | |
| 3 | Droplet initially remains standing beadlike on the paper, dries slowly, linear margins | III | strong shades with slight matt effect | 0 | moderate strikethrough on reverse of the paper | |
| 4 | Droplet initially remains standing beadlike on the paper, dries slowly, beveled margins, slight blotting paper effect | IV | matt shades | — | severe strikethrough on reverse of the paper, reverse still dry | |
| 5 | Droplet is uniformly absorbed, margins more severely beveled, blotting paper effect | V | very matt shades, hardly any color intensity | — | complete strikethrough on the reverse of the paper, reverse moist to soaked | |
| 6 | Droplet is non-uniformly absorbed, margins more severely beveled, high degree of flow of the ink into all levels | | | | | |

Additionally, the following parameters are measured:

| A | diameter of the dried droplets in mm | B | diameter of the dried droplets in mm time to drying in sec | C | length of the drawn-off droplet in mm after 1' activity time (initial drying) |
|---|---|---|---|---|---|

For Test A, 7.5 μl of each ink are applied to the sample and assessed after drying.
For Test B, 1 μl of each ink is applied to the sample and the drying time is measured.
For Test C, 1 μl of each ink is applied to the sample and after a minute the excess liquid is removed with a spatula and the length of the drawn-off ink is measured.

| Color intensity (Color Statistics) | | Dot definition (Feathering) | Transitions (Color Bleed) | | Contour definition (Acuity/Bleeding/ Wicking/feath.) | Text image (Wicking/ Feathering) | Halftone | Visual image quality (Illustration Quality) |
|---|---|---|---|---|---|---|---|---|
| Cyan/mag./ yellow (CMY) | Black (K) | K in CMY | CMY/CMY | K/CMY | | | | |
| 1+ Bright, strongly intense | | | | | | | | |
| 1 Matt, strongly intense | 1 Full shade, strongly intense, satiny | 1 Clear separation, very good to good definition | 1 Clear separation, clearly delimited | 1 Clear separation, clearly delimited | 1 Bar 1 clear, fine | 1 Letters in all fonts/ sizes sharp-very sharp | 1 Gray shade optimally clear, fine lines delimited | 1 Details visible, color shading, color, contrasts, image definition good, dots sharp |
| 2 Matt, pale | 2 Intense black shade | 2 Slight running from black, still good to moderate definition | 2 Slight running, still good delimitation | 2 Slight running, still good delimitation | 2 Bar 1 somewhat indefinite, bar 3 clearly sharp | 2 Letters only in color at all fonts/ sizes sharp - very sharp | 2 Gray shades somewhat darker/ indistinct, fine lines delimited | 2 Details not visible, color shadings not sharp, color, contrasts, image definition good, dots sharp |
| 3+ Bright, mottled | | | | | | | | |
| 3 Strongly intense, marbled | 3 Matt, pale, somewhat mottled | 3 Black edges indistinct | 3 Run, somewhat blurred, mixed colors | 3 Running of black ink, edges indistinct | 3 Bar 3 clear, bar 4 clear | 3 Letters only sharp with large fonts | 3 Gray shade optimally clear, fine lines blurred | 3 Details not visible, color shadings, dots not sharp, color erroneous, contrasts, image definition good |
| 3- Matt, mottled | | | | | | | | |
| 4 Matt, marbled | 4 Washed-out, pale shade, somewhat mottled | 4 Bled, run, blurred | 4 Increased incidence of mixed colors, blurred | 4 Run, blurred, no edge visible | 4 Bar 4 sharp, bar 3 indistinct | 4 Edges indistinct, some bleeding only with black | 4 Gray shade blurred, fine lines blurred | 4 Details not visible, color shadings, dots, contrasts not sharp, color erroneous, image definition good |
| 5 Pale, marbled | 5 Severely marbled | 5 Severe running, barley legible | 5 Severe running | 5 Black penetrates flatly | 5 Bar 4 indistinct, bar 6 clear | 5 Edges indistinct, bleeding in the case of color and black | 5 Gray shade dark to black, fine lines blurred | 5 Details not visible, color shadings, dots, contrast not sharp, color, image definition erroneous |
| 6 Very matt and/or marbled | 6 Very strongly washed-out color (half-tone) and/or marbled | 6 Very severe running, in-distinct, illegible | 6 Very severe ink running, new colors | 6 Mixed color forms | 6 Bar 6 blurred | 6 With small fonts, text illegible | 6 Gray shade colored completely black, fine lines barely perceptible | 6 Image barely perceptible |

The colored coating slips did not receive the usual admixture of cobinders. The formulations were not further enhanced for optimum properties.

The inventive use of the doped silicas may be applied to other formulations.

The disclosure of German application 100 62 449.9, filed Dec. 14, 2000, the benefit of which is claimed herein, is hereby incorporated by reference.

What is claimed is:

1. A foreign-atom-doped precipitated silica having a BET surface area of more than 300 m$^2$/g and a maximum surface concentration of the foreign atoms of between $1 \cdot 10^{-5}$ and 0.05 mmol/m$^2$, wherein said foreign-atom is selected from the group consisting of Zr, Zn, Ti, P, Cr, V, Sc, Ga, In, Fe, Ag, Sc, Mn, Co, Ni, Cu, and combinations thereof; and wherein said foreign-atoms are on the surface of the silica as well as incorporated into the internal structures of the precipitated silica.

2. The foreign-atom-doped precipitated silica of claim 1, wherein the surface concentration of the foreign atoms lies between $1 \cdot 10^{-4}$ and $1 \cdot 10^{-3}$ mmol/m$^2$.

3. The foreign-atom-doped precipitated silica of claim 1, wherein the surface concentration of the foreign atoms lies between $1 \cdot 10^{-4}$ and $1 \cdot 10^{-3}$ mmol/m$^2$.

4. The foreign-atom-doped precipitated silica of claim 1, wherein the BET surface area is between 350 and 800 m$^2$/g.

5. The foreign-atom-doped precipitated silica of claim 1, wherein the BET surface area is between 350 and 800 m$^2$/g.

6. The foreign-atom-doped precipitated silica of claim 2, wherein the BET surface area is between 350 and 800 m$^2$/g.

7. The foreign-atom-doped precipitated silica of claim 3, wherein the BET surface area is between 350 and 800 m$^2$/g.

8. A process for preparing a foreign atom-doped precipitated silica having a BET surface area of more than 300 m$^2$/g and a maximum surface concentration of the foreign atoms of between $1 \cdot 10^{-5}$ and 0.05 mmol/m$^2$, which comprises adding a solution of foreign atoms in the form of organic or inorganic salts to an aqueous sodium silicate solution during addition of sulfuric acid to said aqueous sodium silicate solution;

wherein said foreign-atoms are selected from the group consisting of Zr, Zn, Ti, P, Cr, V, Sc, Ga, In, Fe, Ag, Sc, Mn, Co, Ni, Cu, and combinations thereof; and wherein said foreign-atoms are on the surface of the silica as well as incorporated into the internal structures of the precipitated silica.

9. The process of claim 8, wherein the foreign atoms in the form of their organic or inorganic salts are dissolved in the sulfuric acid that is to be added to the sodium silicate solution, and added.

10. The process of claim 8, wherein the addition of the foreign atoms in the form of their organic or inorganic salts takes place over the same period of time as the addition of the sulfuric acid.

11. The process of claim 9, wherein the addition of the foreign atoms in the form of their organic or inorganic salts takes place over the same period of time as the addition of the sulfuric acid.

12. The process of claim 8, wherein the addition of the foreign atoms in the form of their organic or inorganic salts takes place within the second half of the period of addition of the sulfuric acid.

13. The process of claim 9, wherein the addition of the foreign atoms in the form of their organic or inorganic salts takes place within the second half of the period of addition of the sulfuric acid.

14. The process of claim 8, wherein said foreign atoms being in the form of chlorides, nitrates, carbonates, oxides, hydroxides, oxychlorides, phosphates, oxyhydroxides, oxide sulfates, polycarbonates and/or sulfates.

15. The process of claim 9, wherein said foreign atoms being in the form of chlorides, nitrates, carbonates, oxides, hydroxides, oxychlorides, phosphates, oxyhydroxides, oxide sulfates, polycarbonates and/or sulfates.

16. The process of claim 8, wherein a sodium silicate solution is added simultaneously with the sulfuric acid and with the solution of the foreign atoms.

17. In a method of papermaking, the improvement comprising adding the foreign-atom-doped silica of claim 1.

18. In a method of making printable textiles or printable media, the improvement comprising adding the foreign-atom-doped silica of claim 1.

19. In a method of making paper coatings or overhead films, the improvement comprising adding the foreign-atom-doped silica of claim 1.

* * * * *